Patented Apr. 3, 1923.

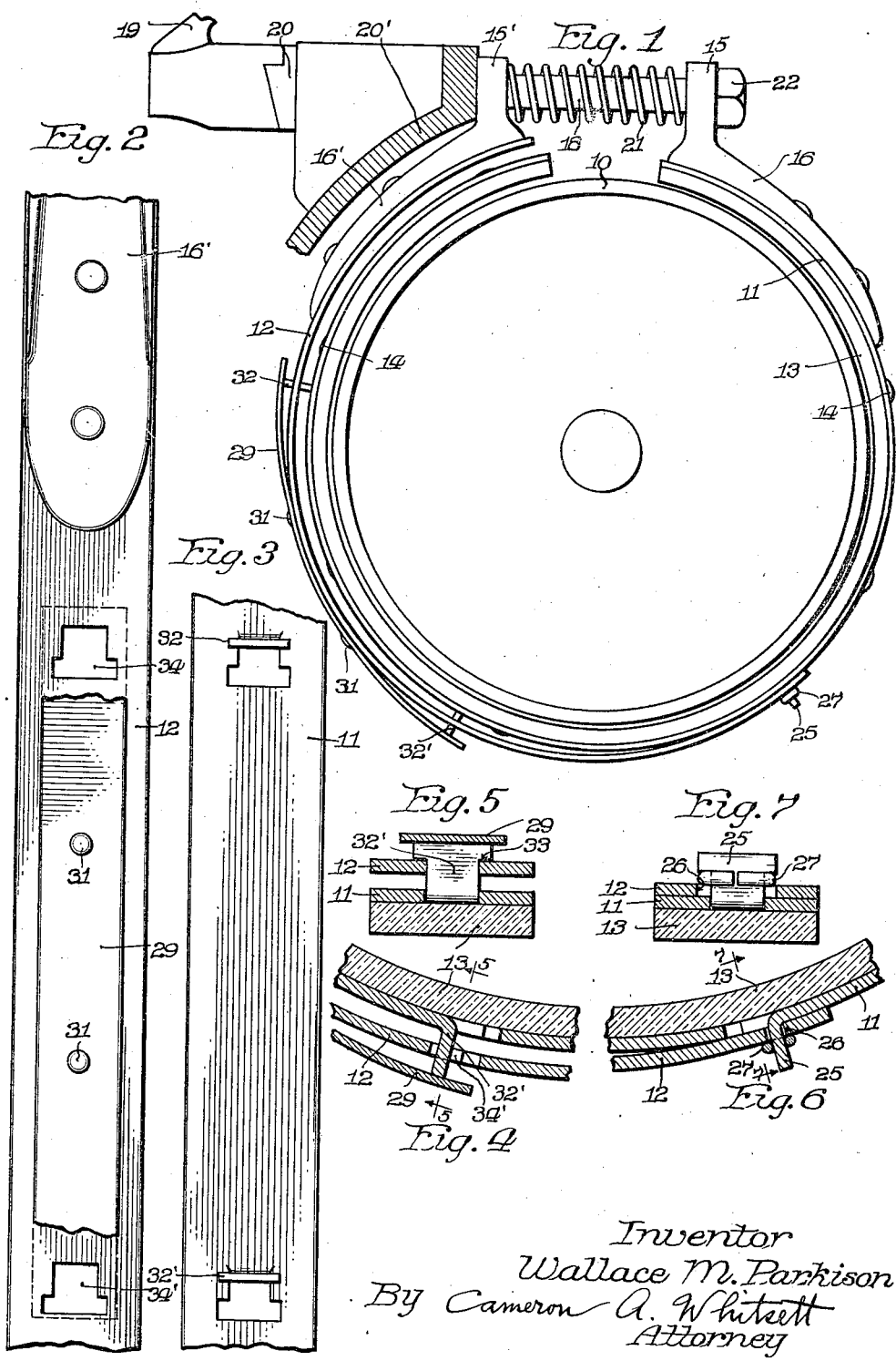

1,450,448

UNITED STATES PATENT OFFICE.

WALLACE M. PARKISON, OF BROOK, INDIANA.

BRAKE BAND.

Application filed February 4, 1922. Serial No. 534,068.

*To all whom it may concern:*

Be it known that I, WALLACE M. PARKISON, a citizen of the United States, residing at Brook, in the county of Newton and State of Indiana, have invented a certain new and useful Improvement in Brake Bands, of which the following is a full, clear, concise, and exact description, reference being had to the accompanying drawings, forming a part of this specification.

My invention relates generally to brake bands, and more specifically to an improved type of band designed to grip the rotating member with a resilient or cushioned braking action so as to avoid vibration and jar. The present type of band is applicable wherever a band of the above characteristics is desirable, such as on the planetary transmission drums and the brake drums of automobiles, or the brake drums of any class of machinery where a cushioned braking action is desirable. The embodiment of band illustrated in the accompanying drawing has been devised particularly for application to planetary automobile transmissions, such as on a well-known automobile, but, as above indicated, the utility of the band is not limited thereto.

In this class of planetary gear transmissions there is a tendency for the gripping of the brake bands on the transmission drums to produce a very objectionable vibration or "shuddering" of the car when starting and changing speed. Similarly, when gripping the propeller shaft brake drum for stopping the car this shuddering of the car is very pronounced.

Bands which would impose this braking action with a resilient or cushioned effect have heretofore been proposed and have obviated the difficulty to some extent. Such bands, however, have, for the greater part, been deficient in that the cushioning means usually caused the braking surface of the band to drag continuously on the drum, thereby wearing the brake lining very rapidly and tending to retard the drum when the band was supposed to be entirely released. A typical prior construction employs an inner braking band and an outer supplemental band between which are interposed one or more cushioning springs which resiliently transmit the braking pressure from the supplemental band to the braking band. Such cushioning spring or springs, however, tend to press the braking band inwardly against the drum even when no braking pressure is being applied through the supplemental band, producing the undesirable wear and dragging above referred to.

It is the fundamental object of the present invention to obviate these objections by providing a cushioned brake band wherein the braking surface of the band is positively pulled back or away from the drum upon release of the brake band.

It is a further object to provide a novel arrangement of the spring cushioning means whereby the desired degree of cushioning motion between the supplemental band and the braking band is obtainable with a compact arrangement and a relatively small space between the bands. In the present embodiment I attain this by disposing the spring or springs externally of the supplemental band, instead of between the bands as has been heretofore proposed, and connect this external spring or springs with the bands in such a manner as to normally tend to separate the same.

It is a further object of the invention to reduce the cost of manufacture and assembly of the present device by so arranging the retracting member which pulls back the braking band, and the member which connects these supplemental and braking bands that these members and their cooperating parts can be formed largely, if not entirely, by punch press, or stamping operations.

In the accompanying drawing wherein I have illustrated a preferred embodiment of my invention:

Figure 1 is a side elevational view of the brake band mounted on a planetary transmission drum;

Fig. 2 is a developed elevational view of the supplemental band showing the same extended into a plane;

Fig. 3 is a similar fragmentary view of the matching portion of the braking band;

Fig. 4 is an enlarged detailed section through one of the hook lugs connecting the two bands;

Fig. 5 is a transverse sectional view through the same;

Fig. 6 is a view similar to Fig. 4 of the lug which connects the end of the supplemental band to the brake band; and Fig. 7 is a transverse sectional view of the latter.

In Figure 1 the present band is shown mounted on a drum 10 which is representative of a planetary gear transmission drum or a propeller shaft brake drum (well known in a typical construction). The device comprises a main brake band 11 and a supplemental outer band 12. Both bands are constructed of suitable spring steel, and the inner brake band 11 is preferably lined with a brake lining 13, which may be removably or otherwise secured in the band 11, as by the rivets 14 or the like. One end of the band 11 has a bifurcated lug 15 extending upwardly therefrom, this lug having a curved toe 16 which is riveted to the end of the band. The other lug 15' is not secured to the other end of the band 11, but is secured to the free end of the outer supplementary band 12, in the same manner as described of the opposite lug 15. The bifurcated portions of these lugs engage over a shaft 18 which is suitably connected to an operating pedal 19 extending up through the floor board into the driver's compartment. A compression spring 21 is confined on the shaft 18 between the lugs 15—15' so as to normally tend to expand the band. The hub end of the pedal 19 is secured to the shaft 18 and has a cam face cooperating with a cam member 20 mounted on the side of the transmission housing 20'. A nut 22 on the end of the shaft 18 affords an adjustment for tightening or loosening the band.

The operation of the shaft 18 and the manner of converging the lugs 15—15' together will be obvious to those skilled in the art and needs no detailed description in the present specification. For clearness of illustration, the clearances between the brake band and the drum and between the two bands have been shown exaggerated.

Referring now to the details of construction of the present band, it will be noted from Fig. 1 that the supplemental band 12 extends a considerable distance around the circumference of the main brake band 11, substantially more than 180 degrees. The attached end of this supplemental band 12 is secured to the main brake band 11 in such a manner that the two bands may be readily assembled and disassembled. For cheapness of construction, this is preferably accomplished by punching a T-shaped lug 25 out of the body of the band 11, and extending this lug through a transverse slot 26 punched out in the supplemental band 12. After the T-shaped lug 25 has been passed through the slot 26 a short piece of wire 27 is bent around under the overhanging shoulders of the T lug and has its ends clenched together along one side of the lug, as clearly shown in Figs. 6 and 7. This wire band positively locks the lug 25 from removal through the slot 26, holding the end of the supplemental band 12 securely to the main band 11. By springing the ends of the wire clip 27 outwardly the same can be easily removed from under the shoulders of the T lug 25.

The spring means which imposes cushioned braking action upon the inner brake lining 13 comprises a leaf spring 29 which is secured by rivets 31 on the outside of the supplemental band 12 intermediate the connecting lug 25 and the free end of the band. The rivets 31 are confined to the central portion of the leaf spring 29, leaving the opposite ends free to exert a spring pressure upon two lugs 32 and 32' extending outwardly from the main band 11 through slots in the supplemental band 12. The ends of the leaf spring 29, by bearing on these lugs 32—32', tend to retain the two bands 11 and 12 separated at this point, substantially as shown in exaggerated form in Fig. 1. The lugs 32—32' are also designed to afford the positive retracting connection between the bands previously described, thereby producing a very simple and inexpensive construction. To this end, the lugs 32—32' are also formed of T-shaped outline to provide the overhanging shoulders 33, although it will be obvious that the present form of retracting connection is merely illustrative and that the members may be of any suitable form and may have connection between these two bands in any suitable manner for performing the function of positively retracting the brake band 11 when the supplemental band 12 is retracted. The two lugs 32—32' are preferably struck up out of the body of the main band 11, and these two lugs are adapted to be passed through the wide portions of T-shaped openings 34 which are punched out of the supplemental band 12. The T-shaped lugs 32—32' are substantially of the same size as the lug 25 and the openings 34—34', thereby greatly simplifying the punching operations. In assembling the device the overhanging ends of the T lugs 32—32' are passed up through the wide portions of the openings 34—34', after which the bands are shifted lengthwise relative to each other and are then secured together over the lug 25. This relative shifting movement between the bands brings the overhanging shoulders 33 of the lugs 32—32' over the narrow portions of the openings 34—34', as clearly shown in Fig. 4. In this relation, it will be apparent that the leaf spring 29 will only separate the bands 11 and 12 until the shoulders 33 on these stop lugs engage with the outer surface of the supplemental band 12. It will be obvious that more than one leaf spring 29 and cooperating lug or lugs 32—32' may be employed if desired; or this single leaf spring can of course be disposed closer to the free ends of the two bands 11 and 12 by shortening the foot 16' of the lug 15', if increased tension at this point is desirable.

Normally, the compression spring 21 between the lugs 15—15' keeps the ends of the bands separated with the brake lining 13 relieved from pressure contact with the drum 10. When the shaft 18 is operated, the initial converging movement between the lugs 15—15' first becomes effective through the supplemental band 12 in drawing the under part of the brake band 11 up into engagement with the drum through the fixed connection 25 between the bands. Thereafter, continued braking motion transmitted to the supplemental band 12 draws the brake band 11 progressively up around the periphery of the drum 11, imposing a gradually increasing pressure upon the brake band through the medium of the leaf spring 29. When the supplemental band 12 is relaxed and moved outwardly under the action of the spring 21 the outer surface of the band 12 moves out against the shoulders 33 on both lugs 32—32' and relieves the inner brake band 11 of the pressure of the leaf spring 29 or positively retracts the brake band from out of braking contact with the drum 10. By virtue of the present construction and particularly of the long length of supplemental band 12 extending through more than 180 degrees of the braking band circumference, I obviate any tendency of the brake band to wear unevenly about its circumference.

I do not intend to be limited to the particular details herein shown and described.

I claim:

1. In combination, a first band, a supplemental band cooperating with said first band, cushioning means for transmitting a yieldable pressure from one band to the other, and means whereby the outer band can retract the inner band against the pressure of said cushioning means.

2. In combination, a brake band, a supplemental band cooperating therewith, cushioning means for transmitting a yieldable pressure from said supplemental band to said brake band, and means cooperating with both of said bands whereby said supplemental band can positively retract said brake band from pressure contact with the brake drum.

3. In a band adapted for braking a rotatable member, the combination of a main band, a supplemental band cooperating therewith, said supplemental band transmitting a resilient pressure to said main band, and means connecting said bands whereby said supplemental band can retract said main band from braking contact with said rotatable member.

4. In a band for braking a rotatable member, the combination of a main band, supplemental band secured thereto, said supplemental band transmitting a resilient pressure to said main band, and lost motion means connecting said bands whereby retractive movement of said supplemental band positively retracts said main band braking contact with said rotatable member.

5. In a band for braking a rotatable member, a main band, a supplemental band cooperating therewith, and cushioning means external of said supplemental band for transmitting a resilient pressure between said bands.

6. In combination, a brake band, a supplemental band cooperating therewith, a cushioning spring external to said bands for transmitting a resilient pressure to said brake band, and lost motion means connecting said bands.

7. In combination, a brake band, a supplemental band connected thereto, a cushioning spring external to said supplemental band and arranged to transmit a resilient braking pressure to said brake band, and means connecting said bands whereby retractive movement of said supplemental band positively retracts said brake band against the action of said spring.

8. In a band for braking a rotatable member, the combination of a main band having its ends free, a supplemental band secured at one end on the outside of said main band, the opposite end of said supplemental band being free and cooperating with the opposite free end of said main band, a cushioning spring external to said supplemental band and arranged to transmit a resilient braking pressure between said bands, and a lost motion member connecting said bands whereby retractive movement of said supplemental band can positively retract said brake band from braking contact with said rotatable member.

9. In combination, a brake band, a supplemental band cooperating therewith, and means connecting said bands comprising a member punched out of one of said bands and engaging with the other band.

10. In combination, a brake band, a supplemental band cooperating therewith, and means connecting said bands comprising a lug struck out of one of said bands and having a projection engaging with the other of said bands.

11. In a brake band of the class described, the combination of a main band, a supplemental band cooperating therewith, and means connecting said band comprising a lug punched out of one of said bands and extending through a cooperating opening in the other of said bands.

12. In a brake band of the class described, the combination of a main band, a supplemental band cooperating therewith, and means connecting said bands comprising a hook-shaped lug punched out of said main band and engaging in an opening in said supplemental band.

13. In a brake band of the class described, the combination of a main band, a supplemental band cooperating therewith, means for securing one end of said supplemental band to said main band, and a lost motion member connecting said bands comprising a lug struck out of the body of said main band and having a projection engaging with said supplemental band.

14. In a brake band of the class described, the combination of a main band, a supplemental band cooperating therewith, means connecting one end of said supplemental band to said brake band comprising a lug punched out of said main band and engaging in an opening in said supplemental band, and a lost motion connection between said bands adjacent their free ends comprising a lug punched out of said main band and engaging in an opening in said supplemental band.

15. In a brake band of the class described, the combination of a main band, a supplemental band cooperating therewith, means for connecting one end of said supplemental band to said main band, a member extending from said main band outwardly beyond the circumference of said supplemental band, and a leaf spring secured to said supplemental band and engaging with said member.

16. In a brake band of the class described, the combination of a main band, a supplemental band cooperating therewith, a member extending from said main band out through an opening in said supplemental band and normally projecting beyond the circumference of said supplemental band, and a leaf spring secured to said supplemental band and bearing on the end of said member.

17. In a brake band of the class described, the combination of a main band, a supplemental band cooperating therewith, a T-shaped lug struck out of said main band and extending through a slot in the end of said supplemental band, detachable means engaging under the shoulders of said lugs for locking said bands together, a plurality of T-shaped lugs struck out of said main band adjacent the free ends of said band, said latter lugs extending through openings in said supplemental band and adapted to afford a lost motion connection whereby retractive movement of said supplemental band positively retracts said main band, and a leaf spring secured to said supplemental band and bearing on the ends of said latter lugs.

In witness whereof, I hereunto subscribe my name this 25th day of January, 1922.

WALLACE M. PARKISON.